(12) United States Patent
Nedez

(10) Patent No.: US 6,589,494 B1
(45) Date of Patent: Jul. 8, 2003

(54) PROCESS FOR ELIMINATING HALOGEN-CONTAINING COMPOUNDS CONTAINED IN A GAS OR LIQUID USING AN ADSORBENT COMPOSITION BASED ON AT LEAST ONE METALLIC ELEMENT

(75) Inventor: Christophe Nedez, Salindres (FR)

(73) Assignee: Institut Francais du Petrole, Cedex (FR)

( * ) Notice: Subject to any disclaimer, the term of this patent is extended or adjusted under 35 U.S.C. 154(b) by 0 days.

(21) Appl. No.: 09/676,786

(22) Filed: Oct. 2, 2000

Related U.S. Application Data

(63) Continuation-in-part of application No. 09/281,775, filed on Mar. 31, 1999, now abandoned.

(30) Foreign Application Priority Data

Mar. 31, 1998 (FR) ............................................ 98 03969

(51) Int. Cl.[7] ........................ B01J 20/06; B01D 53/68; B01D 15/00
(52) U.S. Cl. ................ 423/240 S; 423/241; 423/245.1; 95/131; 95/132; 210/749; 210/757; 210/915; 585/823
(58) Field of Search ............................ 423/240 S, 241, 423/245.1; 502/345, 338, 343; 585/823; 95/131, 132; 210/749, 757, 915

(56) References Cited

U.S. PATENT DOCUMENTS

| | | | |
|---|---|---|---|
| 2,391,149 A | 12/1945 | Frey | |
| 3,935,295 A * | 1/1976 | La Hue et al. | ............. 423/240 |
| 4,036,940 A | 7/1977 | McLane et al. | ............. 423/503 |
| 4,206,148 A | 6/1980 | Biola et al. | |
| 4,594,231 A | 6/1986 | Nishino et al. | ............. 423/210 |
| 4,639,259 A | 1/1987 | Pearson | ........................ 55/71 |
| 5,505,926 A | 4/1996 | Lee et al. | |
| 5,585,082 A | 12/1996 | Ziebarth et al. | |
| 5,589,148 A | 12/1996 | Otsuka et al. | ........... 423/240 S |
| 5,597,540 A | 1/1997 | Akita et al. | .................. 423/241 |
| 5,643,545 A | 7/1997 | Chen et al. | ............... 423/245.3 |
| 5,688,479 A | 11/1997 | Chao | .......................... 423/240 |
| 5,695,634 A | 12/1997 | Neuenfeklt et al. | |
| 5,817,284 A | 10/1998 | Nakano et al. | .......... 423/240 S |
| 5,895,636 A | 4/1999 | Nguyen et al. | |
| 5,928,500 A * | 7/1999 | Richard et al. | .......... 208/262.1 |
| 6,060,033 A * | 5/2000 | Cheng | .................... 423/240 S |
| 6,200,544 B1 | 3/2001 | Blachman | |

FOREIGN PATENT DOCUMENTS

| | | |
|---|---|---|
| EP | 233 394 | 8/1987 |
| EP | 234 433 | 9/1987 |
| EP | 301 272 | 2/1989 |
| EP | 546464 | 6/1993 |
| JP | 9225296 | 9/1997 |

OTHER PUBLICATIONS

Grant and Hackh's Chemical Dictionary, Fifth edition, p. 69 (no month).*
Patent Abstracts of Japan, vol. 98, No. 001, Jan. 30, 1998, & JP 09225296, TOYO, Sep. 2, 1997.
JP9225296—English Abstract.

* cited by examiner

Primary Examiner—Ngoc-Yen Nguyen
(74) Attorney, Agent, or Firm—Millen White Zelano & Branigan

(57) ABSTRACT

The present invention provides a process for eliminating halogen-containing compounds contained in a gas or a liquid, characterized in that the gas or liquid is brought into contact with a composition based on an alumina and/or a hydrated alumina and at least one compound (A) comprising at least one metallic element selected from metals from groups VIII, IB and/or IIB of the periodic table, and in that the total metallic element(s) content is at most 45% by weight with respect to the total composition weight, the complement by weight preferably comprising in a major part alumina and/or hydrated alumina.

44 Claims, No Drawings

PROCESS FOR ELIMINATING HALOGEN-CONTAINING COMPOUNDS CONTAINED IN A GAS OR LIQUID USING AN ADSORBENT COMPOSITION BASED ON AT LEAST ONE METALLIC ELEMENT

CROSS-REFERENCE TO RELATED APPLICATION

This application is a continuation-in-part of application Ser. No. 09/281,775 filed Mar. 31, 1999 now abandoned.

The present invention relates to a process for eliminating halogen-containing compounds, more particularly chlorine-containing compounds, contained in a gas or liquid.

In some industrial applications, halogen-containing compounds, in particular chlorine-containing compounds, contaminate a gas or liquid stream and have to be eliminated.

One illustrative example in the petroleum industry is the elimination of halogen-containing compounds, in particular chlorine-containing compounds, contained in the gas or liquid originating from catalytic reforming.

One aim of catalytic reforming is to produce hydrocarbons with an increased octane number. It has been established that the octane number of a hydrocarbon is higher if it is branched, cyclic or aromatic. Thus hydrocarbon cyclisation and aromatisation reactions are encouraged.

Normally, such hydrocarbon cyclisation and aromatisation reactions take place in the presence of heterogeneous chlorine-containing bimetallic catalysts. Such chlorine-containing catalysts are based on alumina and usually comprise platinum and another metal such as tin, rhenium or iridium. The presence of chlorine in said catalysts is important since, added to the alumina, it provides the system with overall acidity and contributes to re-dispersing the platinum over time, thus stabilising the catalytic activity of the catalyst.

However, adding chlorine is not a solution without disadvantages. Over time, chlorine clutes, in particular in the form of HCl. Such elution results firstly in the constant necessity to recharge the catalyst with chlorine. It also leads to the presence of HCl and other chlorine-containing compounds in gaseous and liquid effluents from catalytic reforming, which can lead to a corrosion problem in the facility and to the formation of other unwanted products which are deleterious to the operation of downstream units.

Catalytic reforming also produces hydrogen. When refining petroleum, hydrogen is a particularly precious product, in particular for use in hydrotreatments which are becoming ever more developed with the aim of environmental protection.

At the outlet from a conventional catalytic reforming process, which operates under a pressure of about 20 bars or more, the gaseous effluents are mainly composed of hydrogen, light hydrocarbons such as methane, ethane, etc., and generally contain traces of HCl and water. It is thus important to be able to eliminate all traces of HCl from such effluents, and then to recycle and use the purified hydrogen, still in the refinery.

Further, regenerative processes or new generation, have recently been developed and are expanding in that field. Such processes operate at a pressure of about 3 to 15 bars or less.

At the outlet from the regenerative catalytic reforming step, light hydrocarbons, traces of HCl and water, traces of unsaturated hydrocarbons such as ethylene, propylene, butene, butadiene etc. have been detected in addition to hydrogen. In the presence of chlorine and in contact with alumina, such unsaturated hydrocarbons are at least partially transformed into organochlorinated compounds which in turn, after many reactions with other organochlorinated compounds and/or unsaturated compounds, lead to the formation of high molecular weight oligomers known as green oils. Such green oils can cause blockages in the facility. Further, a significant drop in the service life of the adsorbent has been observed: in some cases, a drop of 4 to 5 times has been observed.

In that type of process, it is important to be able to eliminate all traces of HCl from such effluents in order to be able to recycle and thus use the purified hydrogen, and to reduce or prevent the formation of green oils.

The aim of the present invention is to provide an improved process for efficiently eliminating halogen-containing compounds in general, chlorine-containing compounds in particular, and HCl more particularly, contained in a gas or liquid.

A further aim of the present invention is to provide a process which uses a composition which will substantially reduce or prevent the formation of halogen-containing oligomers, in particular chlorine-containing oligomers known as green oils, downstream of regenerative reforming processes or new generation.

The invention achieves these aims in providing a process for eliminating halogen-containing compounds contained in a gas or a liquid.

Throughout the following text, the term "process for eliminating halogen-containing compounds" means "process for eliminating, reducing and/or preventing the formation of halogen-containing organic or inorganic compounds including higher weight oligomers".

Thus the present invention provides a process for eliminating halogen-containing compounds contained in a gas or a liquid, characterized in that the gas or liquid is brought into contact with a composition based on an alumina and/or a hydrated alumina and at least one compound (A) comprising at least one metallic element selected from metals from groups VIII, IB and/or IIB of the periodic table, and in that the total metallic element(s) content is at most 45% by weight with respect to the total composition weight. More particularly, the complement by weight of the composition comprises in a major part alumina and/or a hydrated alumina.

Said composition is an adsorbent on which halogen-containing compounds, i.e. halogen-containing organic compounds and halogen-containing inorganic compounds, are retained by absorption. These halogen-containing compounds are eliminated from said gas or liquid under solely adsorption conditions, leading then to the entire purification of the gas or the liquid as no halogen-containing compounds (halogen-containing organic and inorganic compounds) are detected downstream the process. The process of the invention is implemented under reducing conditions, in the presence of hydrogen and/or hydrocarbon in the medium. By reducing conditions, we mean a medium substantially devoid of oxygen or any other oxidizing agent (i.e. less than 0.1% vol of $O_2$ or any other oxidizing agent). In case the process of the invention is carried out in the presence of a small amount of oxygen, oxygen will have no oxidizing power and no effect on the implementation of the process since halogens are adsorbed on the adsorbent composition. Oxygen, if there is some, comes from the contaminated gas or liquid. No oxygen is introduced into the process of the invention by external means.

Throughout the present text, the periodic table used is that from the "Supplement au Bulletin de la Société Chimique de France, No. 1, January 1966".

The composition for the adsorption of halogen-containing compounds and used in the process of the present invention can be in the form of a powder, beads, extrudates, crushed material or monoliths.

The first essential constituent of the absorbent composition is alumina, a hydrated alumina or a mixture of an alumina and a hydrated alumina.

The starting alumina generally has a specific surface area of at least 5 m$^2$/g, preferably at least 10 m$^2$/g and more preferably at least 30 m$^2$/g.

In the present invention, all of the specific surface areas indicated are surface areas measured using the BET method. This means the specific surface area determined by nitrogen adsorption in accordance with American standard ASTM D 3663-78 established from the BRUNAUER-EMMETT-TELLER method described in "The Journal of the American Chemical Society" 60, 309 (1938).

The starting alumina can also have a total pore volume (TPV) of at least 0.10 cm$^3$/g, preferably at least 0.20 cm$^3$/g, more preferably at least 0.25 cm$^3$/g. This total pore volume is measured as follows: the values of the grain density and absolute density are determined: the grain (Dg) and absolute (Da) densities are measured using a picnometry method using mercury and helium respectively. The TPV is given by the formula:

$$[1/Dg]-[1/Da]$$

The processes for preparing the aluminas with the total pore volume and specific surface area characteristics necessary for carrying out the process of the invention are known to the skilled person.

Regarding the alumina, the alumina powder used as a starting material to prepare the composition of the invention can be obtained using conventional processes such as gel precipitation, and rapid dehydration of an alumina hydroxide (or hydrated alumina) such as Bayer hydrate (hydrargillite). This latter alumina is preferred.

Alumina beads can be formed by drop coagulation. This type of bead can, for example, be prepared as described in European patents EP-A-0 015 801 or EP-A-0 097 539. The porosity can be monitored using the process described in EP-A-0 097 539 by drop coagulation of a suspension or an aqueous dispersion of alumina or a solution of a basic aluminium salt in the form of an emulsion constituted by an organic phase, an aqueous phase and a surfactant or an emulsifying agent. Said organic phase can in particular be a hydrocarbon, the surfactant or emulsifying agent is, for example, Galoryl EM 10®.

Alumina can also be obtained in the form of beads by agglomeration of an alumina powder. Agglomeration into the form of beads is carried out directly on the alumina powder by rotary technology. The term "rotary technology" means any apparatus in which agglomeration is carried out by contact and rotation of the product to be granulated on itself. Apparatus of this type includes the rotary bowl granulator, and the rotary drum. This type of process can produce beads with controlled sizes and pore distributions, these dimensions and distributions generally being created during the agglomeration stage. The volumes of pores with a given diameter can also be controlled during this agglomeration step by suitable regulation of the rate of introduction of the alumina powder and possibly of water, the apparatus rotation rate or by introducing a seed.

Alumina extrudates can be obtained by mixing then extruding an alumina based material, said material possibly originating from rapid dehydration of hydrargillite or precipitation of an alumina gel. The porosity of the extrudates can be controlled by the mixing operation conditions for the alumina before extrusion. The alumina can also be mixed with pore-forming agents during mixing. Examples are the extrudates prepared using the process described in United States patent U.S. Pat. No. 3,856,708.

Crushed alumina material can originate from crushing any type of alumina based material such as the beads obtained by any type of process (drop coagulation, rotary bowl granulator or rotary drum) or from extrudates. The porosity of the crushed material can be controlled by selecting the alumina based material to be crushed to obtain them.

Regardless of the form of the alumina, the porosity can be produced by different means such as the choice of granulometry of the alumina powder or the mixture of a plurality of powders with different granulometrics. A further method consists of mixing a compound, a pore-forming agent, with the alumina powder, before or during the agglomeration or extrusion stages, the compound completely disappearing by heating and thus creating the porosity in the alumina.

Examples of pore-forming agents which can be used are wood flour, wood charcoal, sulphur, tars, plastics materials or emulsions of plastics materials such as polyvinyl chloride, polyvinyl alcohols, naphthaline or the like. The quantity of pore-forming agents added is not critical and is determined by the desired pore volume.

Following forming, the alumina obtained can undergo different operations intended to improve its mechanical strength, such as ageing by keeping it in an atmosphere with a controlled humidity followed by calcining then impregnating the alumina with a solution of one or more acids and a hydrothermal treatment in a confined atmosphere.

Finally, after these different treatments, the alumina can be dried, then optionally calcined.

As indicated above, the alumina used as the starting material for preparing the composition of the invention can be obtained by rapid dehydration of a hydrated alumina such as Bayer hydrate (hydrargillite).

This hydrated alumina can also be used directly as a starting material to prepare the composition of the invention. Advantageously, the hydrated alumina is hydrargillite.

When the starting material is hydrated alumina, a binder can be added to the composition to ensure satisfactory mechanical properties. Binders can, for example be based on clay, such as attapulgite, kaolinite, or bentonite.

In the present invention, the hydrated alumina can have a specific surface area or 5 m$^2$/g, preferably over 10 $^2$/g. It can also have a total pore volume (TPV) of at least 0.10 cm$^3$/g.

The hydrated alumina can also be characterised by its loss on ignition (LOI), measured at 300° C., which is advantageously more than 5%, or even more than 10%.

The loss on ignition (LOI) is determined in accordance with the AFNOR standard NF T20-203, October 1973 —EQV ISO 803.

The different forming processes described above for alumina can also be used for hydrated alumina.

A mixture of alumina and hydrated alumina can also be used.

The second constituent in the composition is the doping element, more precisely the metallic element, provided by compound (A).

The composition used in the process of the invention can comprise one or more metallic elements selected from metals from groups VIII, IB, and/or IIB of the periodic table.

Introduction of a metallic element, on or into the alumina and/or hydrated alumina can be carried out using any method which is known to the skilled person. This introduction is preferably effected by depositing the metallic element(s) onto the alumina and/or hydrated alumina.

The metallic element can, for example, be introduced by impregnating the prepared alumina and/or hydrated alumina with at least one compound (A) comprising at least one metallic element or by mixing at least one compound (A) comprising at least one metallic element with alumina and/or hydrated alumina downstream or when forming of the latter.

The doping element can also be introduced into the alumina and/or hydrated alumina by co-precipitating the alumina and/or hydrated alumina and at least one compound (A) comprising at least one metallic compound.

When introducing by impregnation, this can be carried out in known manner by bringing the alumina and/or hydrated alumina into contact with a solution, a sol or a gel comprising at least one doping element in the form of the oxide or salt or a precursor thereof.

The operation is generally carried out by immersing the alumina and/or hydrated alumina in a set volume of a solution of at least one precursor of at least one doping element. The term "solution of a precursor of a doping element" means a solution of at least one salt or at least one compound of the doping element or elements, the salts and compounds being thermally decomposable.

The concentration of salt in the solution is selected as a function of the doping element to be introduced into the alumina and/or alumina hydrate and on the final amount of doping element required.

The doping element impregnation surface is determined by the compound of solution adsorbed. Thus the volume of doping element adsorbed is equal to the total pore volume of the alumina and/or hydrated alumina to be impregnated. It is also possible to impregnate the alumina and/or hydrated alumina by immersing it in a solution of the precursor of the doping element and eliminating the excess solution by draining.

In a preferred implementation, the doping element is introduced by dry impregnation, i.e., impregnation is carried out with just the volume of solution necessary for said impregnation, with no excess.

Compounds (A) acting to introduce at least one metallic element selected from metals from groups VIII, IB and/or IIB of the periodic table into the alumina and/or hydrated alumina can be selected from organic or inorganic compounds. They are preferably selected from inorganic compounds.

More particularly, the term "inorganic compounds" means inorganic salts such as carbonates, bicarbonates, cyanides, cyanates, alkoxylates, hydroxides, sulphates and nitrates.

As mentioned above, said compounds comprise at least one metallic element selected from the following metals:

group VIII: iron and nickel;
group IB: copper; and
group IIB: zinc.

Compounds (A) are preferably selected from nitrates, sulphates, hydroxides, carbonates and bicarbonates of iron, nickel, copper or zinc, used alone or as a mixture.

The composition used in the process of the invention is obtained by heat treating the alumina and/or hydrated alumina after introducing compound or compounds (A). Heat treatment is carried out at a temperature determined as a function of the nature of the doping element or elements.

An alumina and/or hydrated alumina is used which, after introducing at least one compound (A) comprising at least one metallic element as cited above, can be heat treated at a temperature of at least 100° C. This heat treatment can preferably be carried out at a temperature in the range 150° C. to 600° C., more preferably in the range 200° C. to 550° C.

The duration of heat treatment is not critical in itself. It will depend on the temperature: generally, the higher the temperature, the shorter the treatment period.

When introducing the compound or compounds (A), the concentration of the solution of the compound is selected such that the total content of the metallic element or elements is at most 35% by weight, more particularly at most 25% by weight, with respect to the total composition weight.

This content is at least 0.005% (50 ppm) by weight, preferably at least 0.5% by weight with respect to the total composition weight, the metallic element not being iron.

When at least one of the metallic elements is iron, the total iron content is at least 0.1% by weight, preferably at least 0.5% by weight, more preferably at least 0.7% by weight, with respect to the total composition weight.

More particularly, the total content of the metallic element or elements is in the range 0.5% to 20% by weight, more particularly still in the range 0.7% to 15% by weight, with respect to the total composition weight.

The content of alumina and/or hydrated alumina is more particularly at least 35% by weight with respect to the total composition weight.

A variation of the present invention consists in a process for eliminating halogen-containing compounds contained in a gas or a liquid, characterized in that the gas or liquid is brought into contact with a composition based on an alumina and/or hydrated alumina as described above which also comprises at least one compound (B) comprising at least one element selected from alkalis, alkaline-earth elements, and rare earth elements.

In this variation, the composition used comprises both one or more metallic doping elements selected from metals form groups VIII, IB and/or IIB of the periodic table, and one or more alkali, alkaline-earth or rare earth doping elements.

Compounds (B) acting to introduce into the alumina and/or hydrated alumina, at least one element selected from alkali elements, alkaline-earth elements and rare earth elements, can be selected from organic or inorganic compounds. Preferably, inorganic compounds are used.

More particularly, the term "inorganic compounds" means inorganic salts such as carbonates, bicarbonates, cyanides, cyanates, alkoxylates, hydroxides and nitrates.

As mentioned above, compounds (B) comprise at least one element selected from alkali metals, in particular lithium sodium, potassium, rubidium and caesium; alkaline-earth metals in particular magnesium, calcium, strontium and barium; and rare earth elements, in particular cerium, praseodymium and lanthanum.

In a particular implementation of the invention, compounds (B) are preferably selected from sodium and potassium nitrates, hydroxides, carbonates, and bicarbonates.

The alkali, alkaline-earth and rare earth elements can be introduced into the alumina and/or hydrated alumina using any method known to the skilled person, in particular as described above.

Compounds (A) and (B) can be added before, during and/or after forming the alumina and/or hydrated alumina.

However, compounds (A) and (B) can be introduced using three distinct methods.

The first method, which is the preferred method, consists of using a composition obtained by introducing:

i) firstly, compound or compounds (B) into the alumina and/or hydrated alumina, preferably by impregnation, followed by heat treatment carried out at a temperature of 100° C. or more;

ii) then compound or compounds (A) into the alumina and/or hydrated alumina obtained from i) preferably by impregnation, followed by a fresh heat treatment at a temperature of 100° C. or more.

More particularly, in this first method a composition is used which is obtained by introducing:

i) firstly, compound or compounds (B) into the alumina and/or hydrated alumina, preferably by impregnation followed by heat treatment carried out at a temperature in the range 200° C. to 1200° C., preferably 300° C. to 1000° C.;

ii) then compounds (A) into the alumina and/or hydrated alumina obtained from i) preferably by impregnation, followed by a fresh heat treatment carried out at a temperature in the range 150° C. to 600° C., preferably in the range 200° C. to 550° C.

The second method consists of using a composition obtained by introducing:

i) firstly, compound or compounds (A) into the alumina and/or hydrated alumina, preferably by impregnation, followed by heat treatment carried out at a temperature of 100° C. or more;

ii) then compound or compounds (B) into the alumina and/or hydrated alumina obtained in i) preferably by impregnation, followed by a fresh heat treatment carried out at a temperature of 100° C. or more.

More particularly, in this second method a composition is used which is obtained by introducing:

i) firstly, compound or compounds (A) into the alumina and/or hydrated alumina, preferably by impregnation followed by heat treatment carried out at a temperature in the range 150° C. to 600° C., preferably 200° C. to 550° C.;

ii) then compounds (B) into the alumina and/or hydrated alumina obtained from i) preferably by impregnation, followed by a fresh heat treatment carried out at a temperature in the range 200° C. to 1200° C., preferably in the range 250° C. to 1000° C.

The third method consists of using a composition obtained by simultaneously introducing compounds (A) and (B) into the alumina and/or hydrated alumina, preferably by impregnation, followed by heat treatment carried out at a temperature of 100° C. or more.

More particularly, in this third method, a composition is used which is obtained by simultaneously introducing compounds (A) and (B) into the alumina and/or hydrated alumina, preferably by impregnation, followed by heat treatment carried out at a temperature in the range 150° C. to 1200° C., preferably 200° C. to 1000° C.

It is possible to repeat the introduction operations with the same alumina and/or hydrated alumina, and successively introduce a plurality of compounds (A), and if necessary a plurality of compounds (B), into the same alumina and/or hydrated alumina.

Regardless of the selected introduction method, the total content of the alkali, alkaline-earth and rare earth elements is in the range 0.01% to 50% by weight, preferably in the range 0.1% to 40% by weight, with respect to the total composition weight.

The total content of the alkali, alkaline-earth and rare earth elements is advantageously in the range 1% to 40% by weight, more particularly in the range 1.5% to 25% by weight, with respect to the total composition weight.

The specific surface area of the final composition, independently of the nature of the doping element(s), is at least 1 $m^2/g$, preferably at least 5 $m^2/g$, and more preferably over 15 $m^2/g$.

More particularly, the final composition is characterized in that it comprises at most 35% by weight of metallic element selected from metals from groups VIII, IB and/or IIB and between 1.5% and 25% by weight of alkali, alkaline-earth and rare-earth elements, with respect to the total composition by weight.

In another embodiment, the final composition is characterized in that it comprises at most 25% by weight of metallic element selected from metals from groups VIII, IB and/or IIB and between 1% and 40% by weight of alkali, alkaline-earth and rare-earth elements, with respect to the total composition by weight.

The process of the invention is more particularly intended for eliminating chlorine-containing compounds in general, and more particularly for eliminating HCl present in a gas or a liquid.

When the process of the invention is used downstream of a regenerative catalytic reforming or new generation process, HCl elimination is accompanied by a substantial reduction in and/or prevention of the formation of chlorine-containing oligomers or green oils which are also present in the stream.

The process of the invention is advantageously implemented at temperatures not higher than 300° C., more preferably not higher than 200° C. and even more preferably not higher than 100° C. The most preferred temperature range is 0–60° C. As described above, at the outlet from the catalytic reforming step, the gaseous effluents are mainly composed of hydrogen, saturated hydrocarbons, traces of unsaturated hydrocarbons (in regenerative catalytic reforming), traces of halogen-containing compounds, and water. When the effluents contain water, the water content is generally in the range 1 to 50 ppm by volume, at the pressure of the unit. Under these conditions, the HCl content, for example, is often in the range 0.2 to 30 ppm by volume.

The process of the invention is also suitable for eliminating halogen-containing compounds contained in a gas or liquid which is free of water, and also in a gas or liquid containing water.

The term "free of water" means a water content of less than 1 ppm at the pressure of the unit.

The following examples illustrate the invention without limiting its scope.

EXAMPLES

Sample Preparation

Table I describes the different samples (compositions) and recapitulates the preparation conditions.

The alumina of Sample 1 was an oxide obtained with no doping. The residual sodium content can be explained by the starting material used (hydrargillite) which results from the Bayer cycle.

All of the other samples (compositions) were prepared by dry impregnation of the alumina of Sample 1. The batch used for the alumina of sample 1 had a specific surface area of 349 $m^2/g$. After impregnation, it was dried overnight at 100° C., then underwent a calcining step, at the temperature indicated in Table I. Table I also shows the precursors used when impregnating the alumina.

Samples 1 and 2 were prior art, comparative samples.

Samples 3 to 8 corresponded to compositions of the invention.

Samples 6 to 8 result from a first impregnation with sodium followed by calcining at a temperature of 400° F. (composition 6) or 820° C. (samples 7 and 8); then followed by impregnation with iron.

TABLE I

Samples studied and method of preparation

| Sample | Doping element | Precursor(s) | Contents by weight | Heat treatment (° C.) | Specific surface area $(m^2/g)^a$ |
|---|---|---|---|---|---|
| 1 (comparative) | — | — | 0.2% Na | — | 349 |
| 2 (comparative) | Na | NaOH | 6.7% Na | 400 | 147 |
| 3 | Zn | $Zn(NO_3)_2$ | 14.6% Zn | 350 | 206 |
| 4 | Cu | $Cu(NO_3)_2$ | 14.1% Cu | 350 | 239 |
| 5 | Fe | $Fe(NO_3)_3$ | 6.8% Fe | 350 | 191 |
| 6 | Na/Fe | NaOH $Fe(NO_3)_3$ | 6.7% Na 4.9% Fe | 400 350 | 132 |
| 7 | Na/Fe | NaOH $Fe(NO_3)_3$ | 7.0 Na 0.8% Fe | 820 350 | 85 |
| 8 | Na/Fe | NaOH $Fe(NO_3)_3$ | 6.7% Na 2.8% Fe | 820 350 | 86 |

$^a$Final composition surface area.

$H_2O+HCl$ Co-adsorption

HCl adsorption experiments were carried out in a balance kept permanently in a gas stream with helium as the gas vector, at atmospheric pressure.

A HCl—$H_2O$ mixture (9400–500 ppm respectively) was added to the helium (320 ml/min).

The sample in the balance, in an amount of 280 mg, was pre-treated in dry helium at 300° C. for 2 hours. The experiment itself could commence after cooling to and maintaining the temperature at 30° C.

Table II summarises the results obtained.

TABLE II

| | $HCl + H_2O$ adsorption$^a$ | |
|---|---|---|
| Samples | $HCl + H_2O$ (%) | HCl measured (%) |
| 1 | 16 | 11.3 |
| 2 | 22 | 15.6 |
| 3 | 23 | 17.6 |
| 4 | 24 | 18.5 |
| 5 | 28.5 | 17.7 |
| 6 | 25 | 20.7 |
| 7 | 25.5 | 21.0 |
| 8 | 27 | 23.5 |

$^a$In the case of co-adsorption, the weight gain noted was due both to collection of HCl and adsorption of water.

$HCl+H_2O$ Co-adsorption and Detection of Green Oils

Regarding the formation of green oils, a particular procedure was developed to detect, from propylene, the formation of organochlorinated compounds, initially chloropropane, in the several compositions studied.

To this end, 10 g of the composition studied was placed in a reactor kept at 50° C. for 24 hours through which hydrogen containing 2% of propylene, and 12 mmoles of HCl circulated in a closed loop.

An examination of this gas phase was carried out in situ by infrared (1300 $cm^{-1}$ band) and with mass spectrometer analysis to follow any appearance of chloropropane.

Under these conditions, while chloropropane was formed when samples 1 and 2 were used, this was not the case for samples 5, 6 and 8.

After 4 hours of the experiment, the HCl adsorption capacity measured by infrared, for sample 6, was 34%.

A complementary experiment was then carried out, under the same operating conditions, but with only 8 mmoles of HCl.

Sample 8 had an HCl adsorption capacity of 26% (infrared analysis), after 48 hours of experiment.

Whereas it is contemplated that the process of this invention will be conducted under solely adsorption conditions, since the process is conducted under reducing conditions as opposed to oxidizing conditions, it is theoretically conceivable that an extraordinarily low degree of a reaction may take place. Consequently, in the following claims, the term "essentially solely adsorption conditions" is used to describe a process wherein for all practical purposes the reaction is conducted under solely adsorption conditions.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 98/03.969, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for eliminating halogen-containing compounds contained in a mainly hydrocarbon or hydrogen-containing gas or liquid, comprising contacting the gas or liquid with an adsorbent composition comprising an alumina and/or a hydrated alumina and at least one compound (A) comprising at least one doping metallic element from groups VIII, IB and/or IIB of the periodic table, the total metallic element(s) weight content being at most 45% by weight with respect to the total composition weight and at least one compound (B) comprising at least one element selected from alkali, alkaline-earth and rare earth elements, and the total of the alumina and/or hydrated alumina being at least 35% by weight of the total composition, said halogen-containing compounds being eliminated from said gas or liquid under essentially solely adsorption conditions.

2. A process according to claim 1, characterized in that the complement by weight of the composition comprising at least one metallic element from groups VIII, IB and/or IIB of the periodic table, with a total metallic element(s) weight being at most 45%, comprises in a major part alumina and/or hydrated alumina.

3. A process according to claim 1, characterized in that compound (A) comprises at least one of iron, nickel, copper, and zinc.

4. A process according to claim 1, characterized in that the compound (A) comprises at least one metallic element from group VIII.

5. A process according to claim 1, characterized in that an alumina and/or a hydrated alumina is used, which is heat treated at a temperature of at least 100° C. after introducing at least one compound (A).

6. A process according to claim 5, characterized in that the heat treatment is carried out at a temperature in the range 150° C. to 600° C.

7. A process according to claim 1, characterized in that the total weight content of the metallic element or elements is at most 35% by weight with respect to the total composition weight.

8. A process according to claim 1, characterized in that the total weight content of the metallic element or elements in the composition is at least 0.005% (50 ppm) by weight, with respect to the total composition weight, the metallic element not being iron.

9. A process according to claim 1, characterized in that when at least one of the metallic elements is iron, the total iron weight content is at least 0.1% by weight, with respect to the total composition weight.

10. A process according to claim 1, characterized in that the total metallic element or elements weight content is in the range 0.5% to 20% by weight, with respect to the total composition weight.

11. A process according to claim 1, characterized in that compound (B) comprises at least one element selected from sodium, potassium, rubidium, caesium, magnesium, calcium, strontium, barium, cerium, praseodymium and lanthanum.

12. A process according to claim 11, characterized in that the composition used is obtained by introducing:
   i) firstly, compound or compounds (B) into the alumina and/or hydrated alumina, preferably by impregnation, followed by heat treatment carried out at a temperature of 100° C. or more;
   ii) then compound or compounds (A) into the alumina and/or hydrated alumina obtained from i), preferably by impregnation, followed by a fresh heat treatment carried out at a temperature of 100° C. or more.

13. A process according to claim 12, characterized in that the composition used is obtained by introducing:
   i) firstly, compound or compounds (B) into the alumina and/or hydrated alumina, followed by heat treatment carried out at a temperature in the range 200° C. to 1200° C.;
   ii) then withdrawing compound or compounds (A) into the alumina and/or hydrated alumina obtained from i), followed by a fresh heat treatment carried out at a temperature in the range 150° C. to 600° C.

14. A process according to claim 11, characterized in that the composition used is obtained by introducing:
   i) firstly, compound or compounds (A) into the alumina and/or hydrated alumina, followed by a first heat treatment carried out at a temperature of 100° C. or more;
   ii) then introducing compound or compounds (B) into the alumina and/or hydrated alumina obtained from i), followed by a heat treatment carried out at a temperature of 100° C. or more.

15. A process according to claim 14, characterized in that the composition used is obtained by introducing:
   i) firstly, compound or compounds (A) into the alumina and/or hydrated alumina, preferably by impregnation, followed by a first heat treatment carried out at a temperature in the range 150° C. to 600° C.;
   ii) then introducing compound or compounds (B) into the alumina and/or hydrated alumina obtained from i), preferably by impregnation, followed by a heat treatment carried out at a temperature in the range 200° C. to 1200° C.

16. A process according to claim 11, characterized in that a composition obtained by simultaneous introduction of compounds (A) and (B) into the alumina and/or hydrated alumina is used, followed by heat treatment carried out at a temperature of 100° C. or more.

17. A process according to claim 16, characterized in that the heat treatment is carried out at a temperature in the range 150° C. to 1200° C.

18. A process according to claim 11, characterized in that the total content of the alkali, alkaline-earth and rare earth elements is in the range 0.01% to 50% by weight, with respect to the total composition weight.

19. A process according to claim 18, characterized in that the total weight content of the alkali, alkaline-earth and rare earth elements is in the range 1% to 40% by weight, with respect to the total composition weight.

20. A process according to claim 18, characterized in that the total content in metallic element selected from metals from groups VIII, IB and/or IIB is at most 35% by weight and the total content of the alkali, alkaline-earth and rare earth elements is in the range 1.5% to 25% by weight, with respect to the total composition weight.

21. A process according to claim 19, characterized in that the total content in metallic element selected from metals from groups VIII, IB and/or IIB is at most 25% by weight and the total content of the alkali, alkaline-earth and rare earth elements is in the range 1% to 40% by weight, with respect to the total composition weight.

22. A process according to claim 1, characterized in that the gas and/or liquid brought into contact with the composition is free of water.

23. A process according to claim 1, characterized in that the gas and/or liquid brought into contact with the composition contains water.

24. A process for eliminating halogen-containing compounds contained in a gas or a liquid according to claim 1, characterized in that the liquid or gas originates from a conventional catalytic reforming process and/or a regenerative process or from new generation.

25. A process for eliminating halogen-containing compounds contained in a gas or a liquid according to claim 1, characterized in that said halogen-containing compounds are chlorine-containing compounds.

26. A process according to claim 15, wherein the at least one compound (A) is an iron compound and the at least one compound (B) is a sodium compound.

27. A process for eliminating halogen-containing compounds contained in a gas or a liquid according to claim 26, characterized in that said halogen-containing compounds are chlorine-containing compounds.

28. A process according to claim 27, wherein the chlorine-containing compound comprises HCl.

29. A process according to claim 28, wherein the chlorine-containing compound comprises HCl.

30. A process according to claim 29, wherein HCl is present in a gaseous effluent from a reforming step comprised mainly of hydrogen, saturated hydrocarbons, unsaturated hydrocarbons, about 1–50 ppm by volume of $H_2O$ and about 2–30 ppm of HCl.

31. A process according to claim 26, wherein HCl is present in a gaseous effluent from a reforming step comprised mainly of hydrogen, saturated hydrocarbons, unsaturated hydrocarbons, about 1–50 ppm by volume of $H_2O$ and about 2–30 ppm of HCl.

32. A process according to claim 30, wherein HCl is present in a gaseous effluent from a reforming step comprised mainly of hydrogen, saturated hydrocarbons, unsaturated hydrocarbons, about 1–50 ppm by volume of $H_2O$ and about 2–30 ppm of HCl.

33. A process according to claim 1, wherein the adsorbent comprises an iron compound and HCl is adsorbed from a fluid comprising propylene, thereby preventing the formation of chloropropane.

34. A process according to claim 1, wherein the process is conducted under reducing conditions.

35. A process according to claim 1, wherein said contacting is conducted at a temperature not higher than 300° C.

36. A process according to claim 1, wherein said contacting is conducted at a temperature not higher than 200° C.

37. A process according to claim 1, wherein said contacting is conducted at a temperature not higher than 100° C.

38. A process according to claim 1, wherein said contacting is conducted at a temperature in the range of 0–60° C.

39. A process according to claim 1, wherein the at least one metallic element from groups VIII, IB, and/or IIB of the periodic table is a promoter element.

40. A process according to claim 1, wherein the total metallic element(s) weight content is less than 30% by weight with respect to the total composition weight.

41. A process according to claim 1, wherein the hydrated alumina is hydrargillite.

42. A process according to claim 1, wherein the total metallic element(s) weight content is 0.7–15% by weight, with respect to the total composition weight.

43. A process according to claim 1, wherein the total metallic element(s) weight content is 6.8–14.6% by weight, with respect to the total composition weight.

44. A process according to claim 1, wherein compound (A) is an iron compound and compound (B) is a sodium compound.

* * * * *